United States Patent
Hocker et al.

(10) Patent No.: US 9,411,576 B2
(45) Date of Patent: Aug. 9, 2016

(54) SOFTWARE VERSION MANAGEMENT FOR EXECUTING REPLACEMENT ACTIONS

(71) Applicant: INTERNATIONAL BUSINESS MACHINES CORPORATION, Armonk, NY (US)

(72) Inventors: Michael D. Hocker, Poughkeepsie, NY (US); Michael J. Jordan, Poughkeepsie, NY (US); Tamas Visegrady, Rueschlikon (CH); Klaus Werner, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 14/093,661

(22) Filed: Dec. 2, 2013

(65) Prior Publication Data

US 2014/0157251 A1 Jun. 5, 2014

(30) Foreign Application Priority Data

Dec. 4, 2012 (GB) .................................. 1221757.6

(51) Int. Cl.
*G06F 9/44* (2006.01)
*G06F 9/445* (2006.01)

(52) U.S. Cl.
CPC .. *G06F 8/71* (2013.01); *G06F 8/65* (2013.01); *G06F 8/665* (2013.01); *G06F 9/44536* (2013.01)

(58) Field of Classification Search
CPC ................. G06F 8/60–8/68; G06F 8/70–8/71; G06F 8/20
USPC .......................................... 717/168–174, 120
See application file for complete search history.

(56) References Cited

U.S. PATENT DOCUMENTS 4,558,413 A * 12/1985 Schmidt et al. ............... 717/170
6,658,659 B2 * 12/2003 Hiller et al. .................... 717/170

(Continued)

FOREIGN PATENT DOCUMENTS

| CN | 102006332 A | 4/2011 | |
|----|-------------|--------|---|
| EP | 1195675 A1 * | 4/2002 | ............... G06F 9/44 |
| EP | 1429569 A1 | 6/2004 | |

OTHER PUBLICATIONS

Temporal Dependency based Checkpoint Selection for Dynamic Verification of Temporal Constraints in Scientific Workflow Systems—Jinjun Chen, Yun Yang—Swinburne University of Technology—2008 ACM—30th International Conference on Software Engineering (ICSE2008).*

*Primary Examiner* — Francisco Aponte
(74) *Attorney, Agent, or Firm* — William A. Kinnaman, Jr., Esq.; Rachel L. Pearlman, Esq.; Heslin Rothenberg Farley & Mesiti P.C.

(57) ABSTRACT

A software version management system comprising a host driver and at least one software module. The host driver comprises migration means to start, stop and replace the software modules on a computer system in response to replacement actions. The system is characterized by the software module being a downgradable software module comprising a compatibility database specifying dependencies between different versions of the software module; the migration means further comprising i) at least a status means to retrieve temporal information from the downgradable software module; ii) at least a downgrading means responsive to a replacement action to downgrade the downgradable software module to a particular downgrade version and to the status means, the downgrading means identifying an intermediate version of the downgradable software module; the host driver comprising restarting means responsive to the report of the completion of the intermediate version to load and start the downgrade version of the software module.

14 Claims, 5 Drawing Sheets

(56) References Cited

U.S. PATENT DOCUMENTS

| | | | |
|---|---|---|---|
| 6,735,757 B1 | 5/2004 | Kroening et al. | |
| 7,062,676 B2 * | 6/2006 | Shinohara | G06F 11/2028 714/11 |
| 7,383,541 B1 * | 6/2008 | Banks et al. | 717/131 |
| 7,840,942 B2 * | 11/2010 | Duffield | G06F 8/65 717/121 |
| 8,255,286 B2 | 8/2012 | Veres et al. | |
| 8,429,610 B2 * | 4/2013 | Clemm et al. | 717/122 |
| 8,677,341 B2 * | 3/2014 | Willis, II | G06F 8/65 707/674 |
| 8,782,632 B1 * | 7/2014 | Chigurapati | G06F 8/65 717/168 |
| 8,806,471 B2 * | 8/2014 | Vidal | G06F 8/65 717/168 |
| 8,893,116 B2 * | 11/2014 | Haubold | G06F 9/445 713/2 |
| 9,032,386 B1 * | 5/2015 | Vaynshteyn | G06F 8/68 717/168 |
| 2003/0140339 A1 * | 7/2003 | Shirley et al. | 717/171 |
| 2005/0114853 A1 | 5/2005 | Glider et al. | |
| 2005/0216904 A1 | 9/2005 | Needham | |
| 2005/0268283 A1 * | 12/2005 | Clemm et al. | 717/121 |
| 2006/0053274 A1 | 3/2006 | Nyuugaku et al. | |
| 2007/0294684 A1 | 12/2007 | Kumashiro et al. | |
| 2008/0028368 A1 * | 1/2008 | Depew et al. | 717/120 |
| 2008/0046371 A1 * | 2/2008 | He | G06F 8/65 705/51 |
| 2008/0177994 A1 * | 7/2008 | Mayer | G06F 9/4418 713/2 |
| 2009/0193407 A1 * | 7/2009 | Lepeska | 717/170 |
| 2010/0131625 A1 * | 5/2010 | Dehaan et al. | 709/221 |
| 2011/0047536 A1 | 2/2011 | Santos et al. | |
| 2011/0083129 A1 * | 4/2011 | Masaki | 717/175 |
| 2012/0174124 A1 * | 7/2012 | Ward | G06F 8/71 719/331 |
| 2012/0227039 A1 * | 9/2012 | Ferdman | G06F 9/5077 718/1 |

* cited by examiner

SOFTWARE VERSION MANAGEMENT FOR EXECUTING REPLACEMENT ACTIONS

PRIOR FOREIGN APPLICATION

This application claims priority from the United Kingdom patent application number 1221757.6, filed Dec. 4, 2012, which is hereby incorporated herein by reference in its entirety.

BACKGROUND

One or more aspects of the present invention relate in general to data processing systems, and in particular, to a software version management system.

Firmware updates changing functionality, which generally is realized by software updates, are widely used in computing systems. Most systems can apply updates only in inactive state, problematic in enterprise environments, where system downtime must be minimized. Specially structured applications may continue to operate with special hardware support while their firmware image is being updated, restricting the duration of service interruption to application restart time—considerably below that of firmware updates. Substantially similar preparation allows updates to preserve any application data even if applications themselves are updated. The combination of these capabilities, known as concurrent update ("CU"), is used in high-availability systems such as mainframes.

State-of-the-art, high-availability computing systems may support the capability to upgrade firmware of system components while the previously loaded versions remain operational, and restart applications only after the update completes. Applications designed to support CU will recognize and work with any persistent data created by previously created firmware, to prevent data loss during the update.

In most current CU-capable systems, the CU-compatibility of multiple firmware revisions is a manually maintained database, embedded directly into host drivers. Annotations designating pairs of firmware revisions as CU-capable—or the opposite, labeling them explicitly as disruptive, warning about application-visible loss of service/data—are considered a property of host drivers, and are maintained as part of host driver firmware. In current systems, host drivers themselves tend to maintain their firmware-image repositories, therefore the close connection is consistent with overall architecture. While this method has advantages—such as the tight integration, and possible optimizations due to data locality—the currently used method does not easily scale to multi-vendor scenarios. Similarly, when newer firmware revisions are introduced, their implied CU-compatibility prompts an update of the corresponding host drivers.

In U.S. Pat. No. 7,383,541 B1, which is hereby incorporated herein by reference in its entirety, a method is disclosed for providing continued correct interoperation of computer software implementations even when the versions of the implementations differ, particularly providing interoperation of a first execution image of a first version and a second execution image of a second version. A compatibility matrix specifies whether the versions are compatible, base-level compatible, or incompatible. The compatibility matrix comprises a sparse table that stores a compatibility indicator for all permutations of a plurality of versions of a network operating system. As part of initialization of a system that includes the first execution image and second execution image, version information for the execution images is determined. An entry in the compatibility matrix corresponding to the versions is identified. The execution images are operated in a fully synchronized state when the identified entry of the compatibility matrix specifies that the versions are either compatible or base-level compatible. Individual components of the execution images interoperate according to the results of individual session negotiations. If the versions are incompatible, an alternative redundancy operation mode may be used. Embodiments provide for negotiation of compatible message versions and capabilities among peer components or clients of the execution images as source information to generate the compatibility matrix.

BRIEF SUMMARY

In one aspect, an improved software version management system is provided, in order to enable efficient downgrades from more recent to past versions of the same software.

One or more aspects are achieved by the features of the independent claims. The other claims, the drawings and the specification disclose embodiments of the invention.

According to one aspect, a software version management system is provided to start, stop and replace one or more software modules on a computer system based on replacement actions. The software version management system includes a memory; and a processor in communications with the memory, wherein the software version management system is configured to perform a method. The method comprising, for instance, retrieving temporal information from a downgradable software module, the downgradable software module including a compatibility database specifying dependencies between different versions of the software module, the compatibility database comprising one or more revision identifiers and one or more attributes thereof for the different versions; downgrading, based on a replacement action to downgrade, the downgradable software module to a particular downgrade version, the downgrading identifying an intermediate version of the downgradable software module; and restarting, based on a report of completion of the intermediate version, loading and starting the downgrade version of the software module.

BRIEF DESCRIPTION OF THE SEVERAL VIEWS OF THE DRAWINGS

Aspects of the present invention together with the objects and advantages may best be understood from the following detailed description of the embodiments, but not restricted to the embodiments, wherein is shown in.

DETAILED DESCRIPTION

Figure 1:
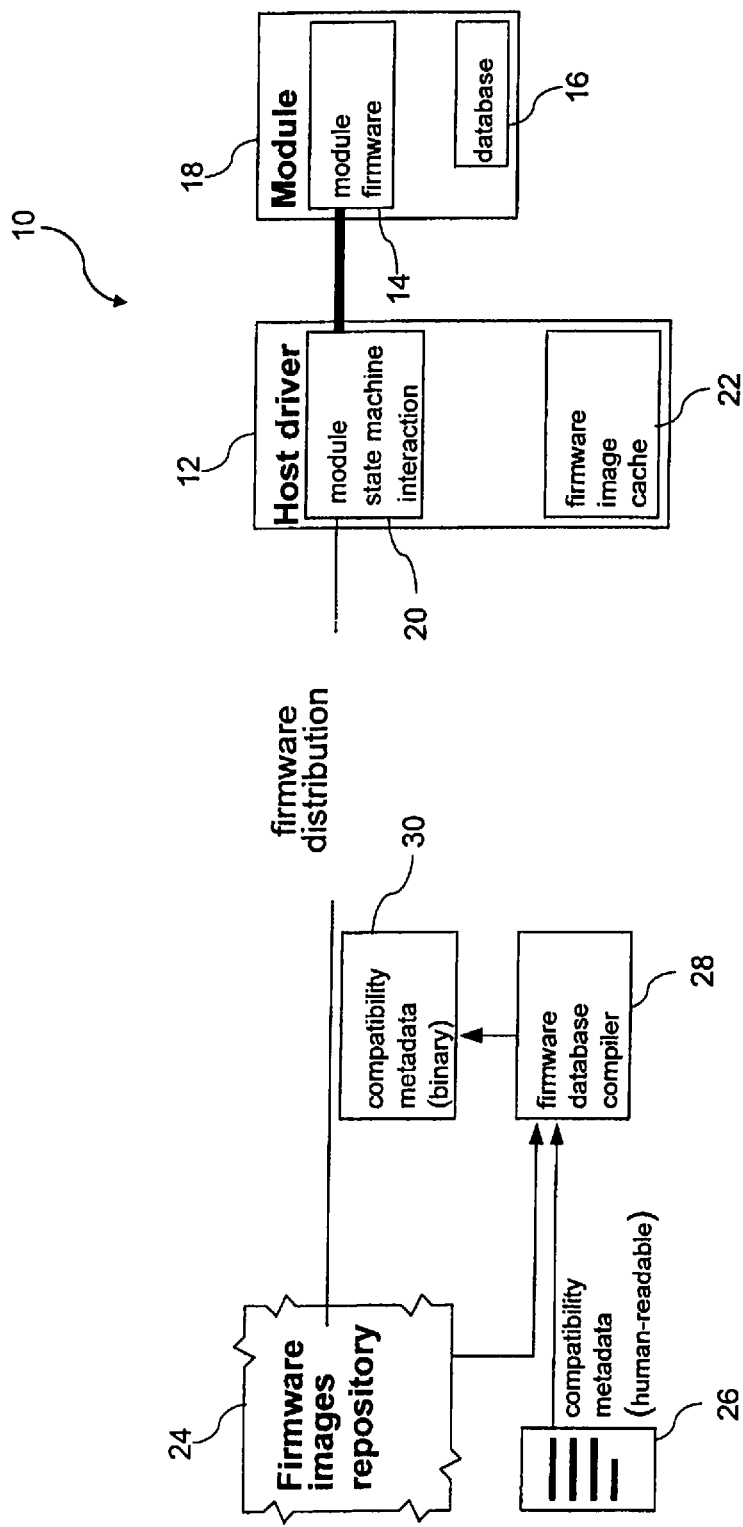
FIG. 1 a system overview according to an example embodiment of the invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

One or more aspects address particularly software systems, but it has to be mentioned that all aspects are fully concerning also firmware systems, which are generally a combination of persistent memory, software program code and data stored in it. Typical examples of devices containing firmware are embedded systems, computers, computer peripherals, or the like. In the following, software is also used as a synonym for firmware, as updating firmware systems generally means updating the software or data of the system. Further the notation software version management system will be abbreviated by system only if convenient and unmistakably.

In the drawings the notation firmware generally may be understood as the synonym software. The notation system is conveniently used as a synonym for software version management system.

For illustrating one or more aspects of the invention, FIG. 1 shows a system overview according to an example embodiment of the invention. A CU-capable system 10 according to an example embodiment comprises endpoints with an upgradeable software or firmware module 14 in a module 18 such as, e.g., a hardware security module (HSM), a possibly internally stored compatibility database 16 state, host drivers 12 including a state machine 20 steering the module 18 through the CU process, and end-user administrative controls to monitor and manage the process. The used firmware originates from a firmware images repository 24, which together with human-readable compatibility metadata 26 feeds its information into a firmware database compiler 28 for creating compatibility metadata in a binary format 30. This compatibility metadata information 30 may serve as input to downgrading processes with compatibility databases 16 as described by one or more aspects.

A system 10 is described which separates revision-compatibility information from host drivers 12, and deposits them as annotations of the actual firmware images 14. Assuming image formats support auxiliary metadata, a simple binary dictionary format as delivered by the compatibility metadata 30 may convey all necessary information about CU-capability. The system uses a format optimized for single-pass parsing, and its semantic integrity be easily verified, therefore it may be used even in security-critical and resource-limited embedded environments.

Figure 2:
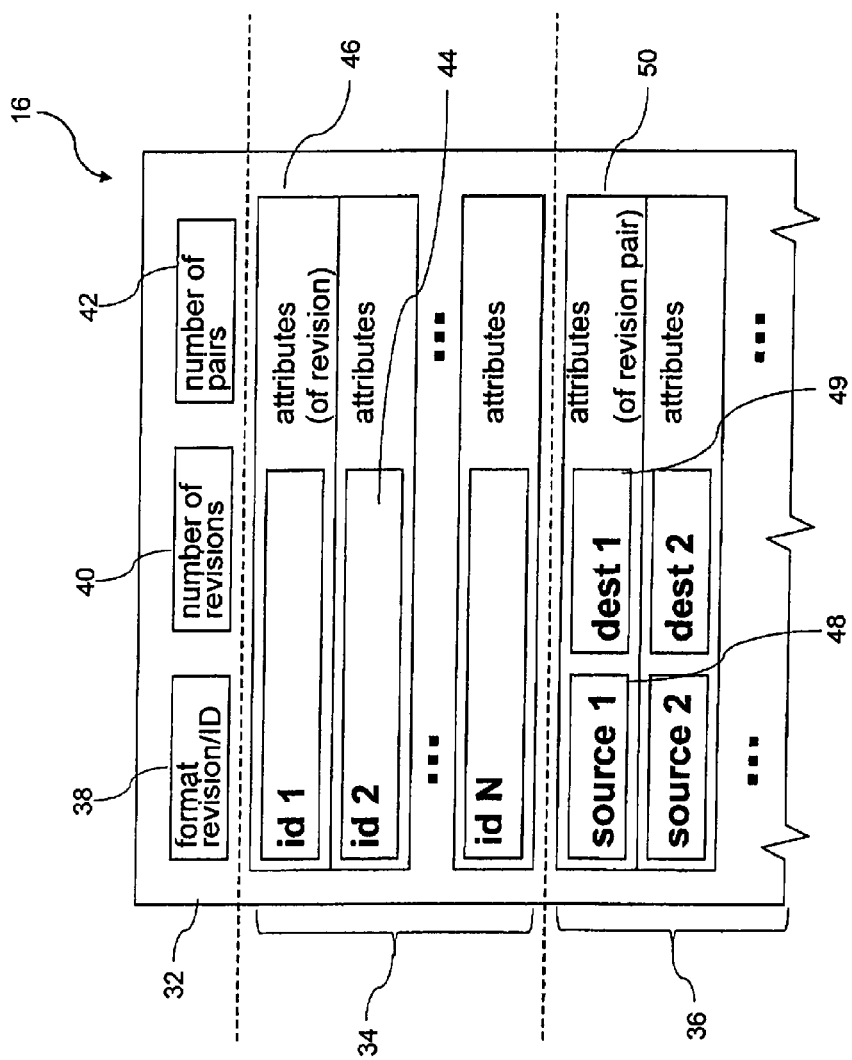
FIG. 2 a binary data structure of a compatibility database according to an example embodiment of the invention.

FIG. 2 depicts a binary data structure of a compatibility database 16 according to an example embodiment of the invention. The compatibility database 16 is built describing pairs of revision identifiers 48, 49 and their attributes 50 in a straightforward binary form:

(i) A header section 32, encompassing a format revision identifier 38, a number of revisions 40 and a number of pairs 42.

(ii) A revisions section 34, encompassing one or more unique revision identifiers 44 (labelled id 1, id 2 . . . , id N in the Figure) of firmware revisions. Revisions are also annotated by attributes 46, specific to the revision identifier 44 (such as its development/production state, issuing entity, or other image-specific metadata).

In a practical instantiation, entries could be required to be in a specific order of entries, such as revision identifiers 44 in strictly increasing order. Such restrictions facilitate faster processing, may be verified during reading, and may be conveniently enforced by—offline—database-construction facilities.

(iii) A subsequent compatibility database section 36 related to revision pairs which enumerates source/destination pairs of revisions 48, 49, referencing revisions through their index, as e.g. "source 1" 48, "dest(ination) 1" 49. Index-based indirect references limit compatibility database growth, especially important since the number of revision pairs 42 will be the dominant compatibility database-scaling actor.

Revision pairs 36 also include attributes 50 describing the properties of the migration from the first revision to the second one. Generally, these revision pair attributes 50 describe properties like CU-capability if the first revision 48 is replaced by the second one 49, possibly the commutativity of CU-capability, or other relevant attributes.

If an alternative update path is offered for a pair of source 48 and destination 49 revisions, it may also be encoded as an attribute 50 of the pair itself. Thereby it is relied on the capability of prescribing temporal dependencies between revisions, such as mandating an intermediate update to prevent data loss in special cases.

As with revision identifiers, a practical instance would force some well-defined order for pairs of revisions.

(iv) Optionally, digital signatures or other integrity/authenticity information may be added as part of the compatibility database structure.

In one embodiment, the compatibility database 16 only references firmware revisions, but does not include actual firmware—however, a revision attribute 46 could indicate whether the referenced revision is "local" or "foreign" to the repository which carries the compatibility database 16. Such additional attributes 46 may accelerate searching, for example, when multiple databases 16 referencing each other are processed. Since cross-database references are easy to manage, the described system 10 (FIG. 1) easily accommodates multiple databases 16, such as if selecting firmware from multiple repositories.

Figure 3:
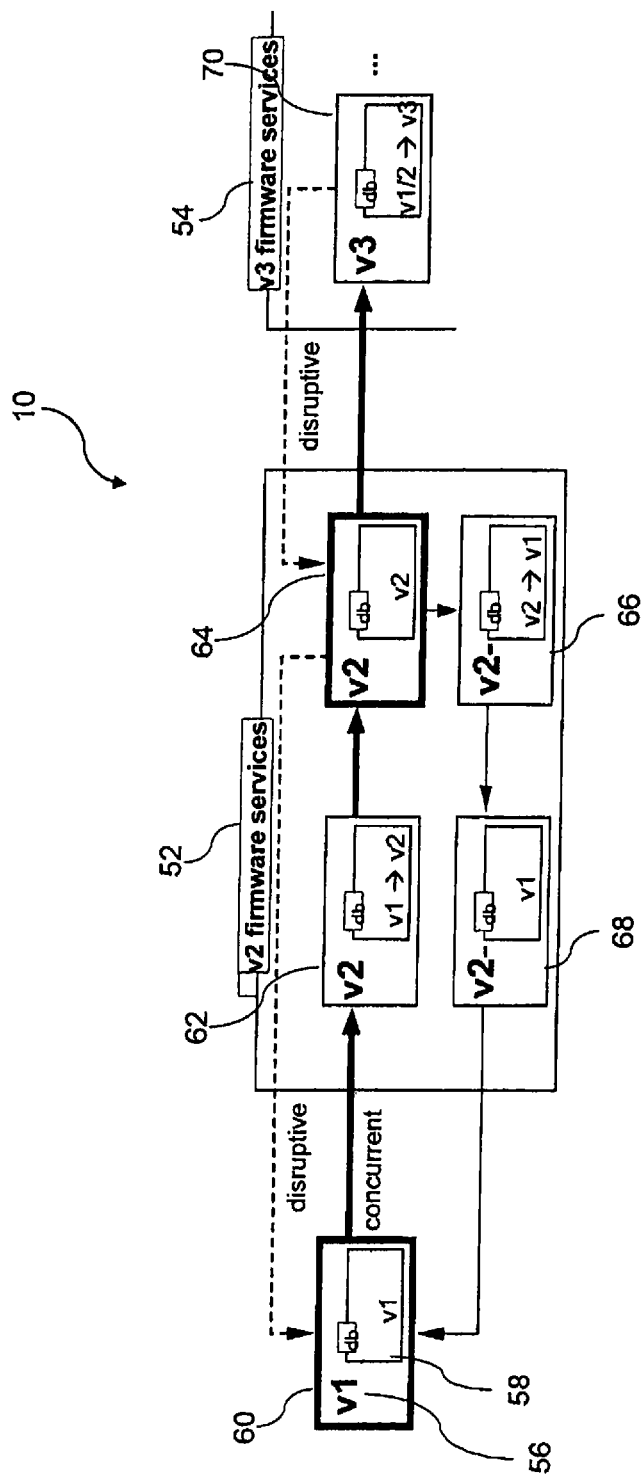
FIG. 3 a detailed overview of disruptive and concurrent upgrade paths within a multi-version system according to an example embodiment of the invention.

In FIG. 3 a detailed overview of disruptive and concurrent upgrade paths within a software version management system 10 according to an example embodiment of the invention is shown. Different versions of firmware are nominated v1, v2, . . . , where the higher number version is representing a more recent version of the firmware. Upgrade paths would be typical of a real system 10, showing firmware (v1, v2, v3) and database state separately, where in the database field (db) the version of the firmware (v1, v2, . . . ) as well as a possible transition (v1→v2, e.g.) is marked:

(i) The original firmware release combines v1 firmware 56 services with v1 database 58 in state 60, which represents a steady state. In FIG. 3 the different states 60, 62, . . . 70 comprise a firmware version and a database version as is depicted for state 60 with firmware 56 and database 58, for example.

Firmware versions based on v1 databases 58 may be CU-compatible, which are included in the v1 firmware 56 designation. Generally, multiple revisions are encountered for each database version.

(ii) Subsequent firmware releases introduce the v2 database format. Generally, the format change would be prompted by changing services, which is collected under the v2 firmware service name 52 (similarly as the v1 firmware is defined). Modules created at this level would begin their service life with v2 firmware and v2 databases (state 64).

(iii) For modules migrated from v1 firmware to v2 first their firmware is updated to v2, which then transparently migrates their databases to v2 (state 62). After database migration has completed, effectively the v2 steady state with v2 firmware and database is entered (state 64).

Firmware favorably retains backward compatibility, and may therefore update databases when older versions are encountered. Transparent format updates allow regular—forward—firmware migration to be CU-compatible.

(iv) Downgrading v2 firmware (state 64) to v1 (state 60) directly is assumed to be disruptive. Newly loaded v1 firmware would not be able to interpret v2 data created previously by its own future relative.

The newly started v1 firmware would find the v2 database of the preceding firmware—which would actually be a temporally preceding instance of a successor revision. Thereby it is assumed that a database format from the future would be treated as corrupt data by earlier firmware, and the subsequent recovery action would reinitialize structures to v1 database defaults, clearly incompatible with CU expectations.

To extend the described system with the capability to migrate back to past firmware releases, dedicated firmware revisions to future releases are added. Labeled in FIG. 3 with the term "v2-" (states 66 and 68), firmware is denoted which transparently downgrades its database to v1 format, when loaded to a module with a v2 database. Since v2-firmware understands v2 database formats, it may be concurrently loaded after any firmware based on v2. When loaded to a backend with a v2 database, v2-firmware would begin a downgrade of the database to v1 (in state 66), terminating when the database conversion is finished, reaching state 68. At this point, a second concurrent update may load any firmware based on a v1 database.

The CU-compatibility database would show a direct v2 to v1 downgrade (i.e., state 64 to state 60) as non-CU-capable or disruptive. It would, however, recommend v2-firmware as an intermediate firmware revision, and show that a state 64 to state 66 transition, followed by an indirect transition to state 60, would pass through two CU downgrades, and therefore would also classify as CU. Such sequence of images could be described by the compatibility database, annotating the revision pair with the identifier of the recommended intermediate revision.

At some point during v2 execution, the persistent database 16 (FIG. 2) would revert to v1 form, but it would be preferable to offer v2 firmware services, even if the (older) database format would lack the features to support them.

In a CU-capable environment, a firmware update may have deposited a more recent application binary to a module containing data structures created by an earlier version of the same application. After an application is restarted, its recent version finds module-internal data which differs from the native format of the then-current version (see state 62 in FIG. 3 for example). Applications therefore may be able to uniquely identify files they may encounter—typically, through file format versioning—and usually transparently upgrade database formats from their own past (transition from state 62 to state 64 in FIG. 3).

The described system scales to multiple database revisions. Subsequent firmware versions v3 54 with state 70, v4 . . . would be substantially similarly deployed. It is assumed that backward-migrating versions v3- and v4- would be created, repeating retroactive migration possibly to multiple past database formats. The direct downgrading from v3 state 70 to v2 state 64 again would be a disruptive transition.

Generally, firmware and database state evolve along the thick arrows in FIG. 3 during regular upgrades. Newly added modules would enter the system in the steady state of their firmware version; modules migrated from past versions would incrementally converge to their steady state.

Figure 4:
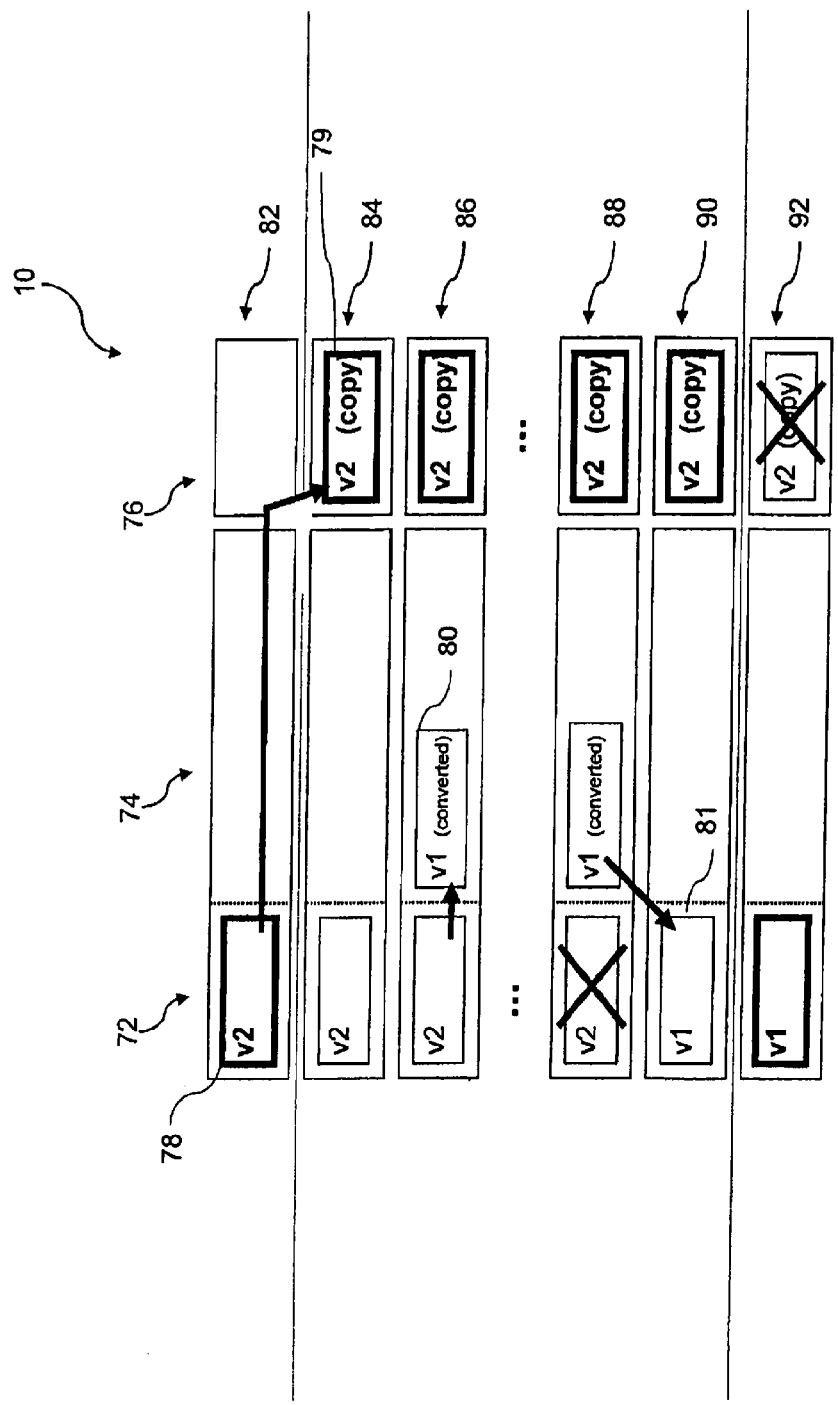
FIG. 4 an overview of compatibility database operations during retroactive database conversion according to an example embodiment of the invention.

In FIG. 4 it is described how transient databases may be created to support v2 application programming interfaces (APIs) fully in a transient form which would be automatically removed if the module is restarted after conversion according to an example embodiment of the invention. FIG. 4 therefore shows three different file systems, a persistent storage or non-volatile file system 72, a non-volatile file system comprising transient files 74 and a transient storage or volatile file system 76 for different steps of the downgrading process. The different steps 82, 84 . . . 92 of the downgrading process are depicted from top to bottom of FIG. 4.

The following multi-step process would allow a v2-firmware to provide all v2 services during the entire conversion, even services which depend on v2 database features, after persistent structures have been rolled back to v1 form:

(i) When loaded (step 82), v2-specific sections of v2 databases 78 are replicated to transient storage 76 (step 84), without changing originals. This copy 79 is used only as a temporary resource, and may be simply removed if the module is restarted during conversion.

(ii) The v2 database is converted back to v1 form, depositing a temporary copy 80 in non-volatile storage 74 (step 86). It is assumed that all firmware versions recognize and remove certain files if encountered during startup, therefore, a temporary copy may be safely written if it is categorized as such.

If interrupted during conversion, the v2-firmware would restart the downgrade, discarding any partially converted data. Intermediate files are clearly flagged as such, therefore resolution after interruption is unambiguous.

(iii) During the conversion, the v2-firmware may continue to serve requests based on the original v2 database, logging any updates separately. The v2 firmware will revisit records, and update their equivalents in the converted v1 database 80, if they are changed by host requests after the start of conversion.

(iv) Once conversion is complete (step 88), the original—persistent—v2 database is replaced with its v1 counterpart 81 (step 90). Since these copies reside within the same file system 72, replacement is possible as a primitive.

(v) Once the persistent database is in v1 format 81, the v2-firmware will update the copy of the v2 only in transient storage 76, for data structures or fields which v1 databases may not represent. As long as the module is not restarted, the transient database may continue to support features not present in the v1 database format. If the module is restarted (step 92), the transient v2 database 79 will disappear, creating an environment with only a v1 database 81 (i.e., CU-compatible to any firmware).

(vi) Conversion is reported as complete. At this point, the module may be safely loaded with v1 firmware, as its persistent storage 72 contains only v1 structures.

The exact time of switching between v2 and v1 services, i.e. the crossover when the previous API disappears, is not exactly defined. In the absence of unexpected power loss and system restart, the described system could add notifications to indicate impending loss of service. However, since a concurrent downgrade would be expected to lead to eventual loss of v2 API services, the system may be operated without exact notification.

During the downgrade process, the module 18 of FIG. 1 may be safely restarted, and will either restart the downgrade, or report completion. The rationale for using files on multiple file systems 72, 74, 76 is for clarity of resolution in case of system restart; at the same time, the additional space used in the non-volatile file system 74 will be limited.

Figure 5:
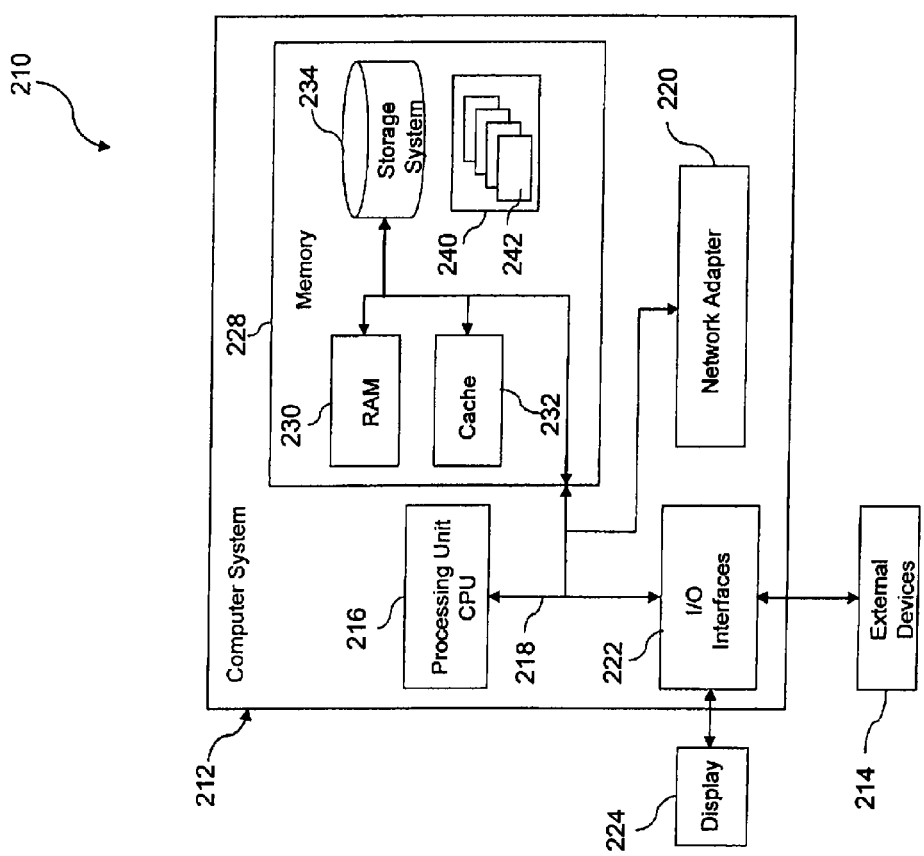
FIG. 5 an example embodiment of a data processing system for running a system according to one or more aspects of the invention.

Referring now to FIG. 5, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

According to one aspect, a software version management system is provided, comprising a host driver and at least one software module, wherein the host driver comprises migration means to start, stop and replace the software modules on a computer system in response to replacement actions, characterized by the software module being a downgradable software module comprising a compatibility database specifying dependencies between different versions of the software module; the system further characterized by the migration means further comprising i) at least a status means to retrieve temporal information from the downgradable software module, ii) at least a downgrading means responsive to a replacement action to downgrade the downgradable software module to a particular downgrade version and to the status means, the downgrading means identifying an intermediate version of the downgradable software module, and the host driver comprising restarting means responsive to the report of the completion of the intermediate version to load and start the downgrade version of the software module.

One or more aspects comprise in general: describing a firmware annotation to describe firmware compatibility, specifying a host driver interface reacting to the compatibility database, prescribing a backwards-migration protocol as a sequence of incremental software downgrades, implementing the described firmware downgrade path with a special-purpose converter firmware, and applying multiple updates, converging to a desired past firmware version, without losing application data.

This compatibility implies file versioning which means that the exact version of a file may be unambiguously identifiable and future firmware may understand—possibly migrate—all past firmware versions.

Favorably, the software version management system, in at least one aspect, is capable of separating revision-compatibility information from host drivers, and can deposit them as annotations of the actual firmware images. Assuming image formats support auxiliary metadata, a simple binary dictionary format may convey all necessary information about CU-capability. The described system uses a format optimized for single-pass parsing and its semantic integrity be easily verified, therefore it may be used even in security-critical and resource-limited embedded environments.

Firmware annotated with CU-compatibility information may be used by a host driver to infer CU-compatibility even without initiating an update. Assuming modules can report their current configuration, the results of applying a host-requested update—such as loss of service or data—may be unambiguously derived by the driver. When requested to update firmware, the host driver may be programmed to reject disruptive updates, select the fastest update path regardless of data loss, or to enforce similar administrator-driven policies. The used annotation format can encode all relevant attributes, which the host driver may derive, and then combine with administrative settings. Thus automated CU-policy enforcement based on firmware-embedded revision databases, with potentially unrelated firmware sources and without necessitating driver updates are offered by one or more aspects of the described system.

In one aspect, the compatibility database may specify temporal dependencies between persistent data of the particular version of the software module and other versions of the software module. Thus it is possible to distinguish if different versions of software modules are compatible or not and which version are precessors or successors of current software modules.

It is assumed that binary forms of the compatibility database are constructed from human-readable metadata, such as product documentation. Since the only data structure needed—pairs of unique identifiers—may be maintained even in simple text files, the system could be effectively maintained within adjunct logs of a regular development process. In such a system, developers would maintain compatibility in tagged, human-readable form, and binary forms would be compiled from the same source, before they are used to annotate the final distribution images.

In one aspect, the intermediate version of the downgradable software module may be identified from the retrieved temporal dependencies and the downgrade version and be reported to the downgradable software module, wherein the intermediate version comprises means to convert the compatibility database to the downgrade version of the downgradable software module. The ability to specify temporal dependencies, when implemented together with a suitably prepared driver state machine, may implement retroactive concurrent updates, migrating firmware revisions to past, incompatible versions, without service interruption.

According to one aspect, the intermediate firmware revision—a so-called down-converter—is based on the recent firmware version, which firmware writes compatibility databases in a previous format, but it can read more recent formats. Since the intermediate firmware understands recent database formats, it may be obviously loaded as a concurrent update after recent firmware versions. When the converter firmware has reported the completion of the database conversion, it may start a concurrent update to any firmware recognizing the downgraded database—including past firmware versions.

In one embodiment, the downgrading means may be responsive to the report of the intermediate version from the host driver, stopping any activities of the downgradable software module and subsequently loading and executing the intermediate version and reporting the completion of the intermediate version to the host driver. In addition to data structure identification, applications designed for CU-capability may favorably be able to interact with CU infrastructure, such as asynchronous notifications at specific stages of the CU procedure in order to achieve a successful downgrading process.

In one aspect, the downgradable software module may be started by the restarting means after completion of the conversion of the compatibility database to the downgrade version of the downgradable software module. At this point the software module may be safely loaded from the downgraded firmware, as its persistent storage contains only downgraded firmware structures.

In one aspect, downgrading of the software modules may be performable without service interruption. While one or more aspects of the described system increases the number of updates when migrating to earlier revisions—compared to the disruptive cases—the CU-capable downgrade is possible without service interruption or loss of application data.

In an embodiment, the software version management system may be extendable to combine multiple databases describing compatibilities between software modules from multiple sources. Since CU-compatibility is usually the exception, host drivers should assume that revision pairs not found within compatibility databases are not CU-compatible. Specific instantiations may therefore allow drivers to query other databases in such cases, or report undocumented configurations. In systems with strict controls on allowed firmware one or more aspects of the described system may be easily adapted to report undocumented revision pairs as an infrastructure error.

According to a further aspect of the invention a data processing program for execution in a data processing system is provided comprising an implementation of an instruction set for running a software version management system as described herein when the data processing program is run on a computer.

Further a computer program product is provided comprising a computer usable medium including a computer readable program, wherein the computer readable program when executed on a computer causes the computer to run a software version management system, comprising a host driver and at least one software module, wherein the host driver comprises migration means to start, stop and replace the software modules on a computer system in response to replacement actions, characterized by the software module being a downgradable software module comprising a compatibility database specifying dependencies between different versions of the software module; the system further characterized by the migration means further comprising i) at least a status means to retrieve temporal information from the downgradable software module, ii) at least a downgrading means responsive to a replacement action to downgrade the downgradable software module to a particular downgrade version and to the status means, the downgrading means identifying an intermediate version of the downgradable software module, and the host driver comprising restarting means responsive to the report of the completion of the intermediate version to load and start the downgrade version of the software module.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Rash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is provided, comprising software code portions for running a software version management system as described above.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A software version management system to start, stop and replace one or more software modules on a computer system based on replacement actions, said software version management system comprising:

a memory; and a processor in communications with the memory, wherein the software version management system is configured to perform a method, said method comprising:

retrieving temporal information from a downgradable software module, the downgradable software module comprising a compatibility database specifying dependencies between different versions of the software module, wherein the compatibility database comprises one or more revision identifiers and one or more attributes thereof for the different versions, and wherein the attributes describe properties of a migration from a first version of the different versions to a second version of the different versions, the properties comprising a concurrent update capability if the first version is replaced by the second version;

downgrading, based on a replacement action to downgrade, the downgradable software module to a particular downgrade version, the downgrading identifying an intermediate version of the downgradable software module, wherein the intermediate version comprises logic to convert the compatibility database to the downgrade version of the downgradable software module and based on execution and completion of the logic, the processor updates the software module to a version of the software module that recognizes the downgraded compatibility database; and restarting, based on a report of completion of the intermediate version, loading and starting the downgrade version of the software module.

2. The software version management system according to claim 1, wherein the compatibility database specifies temporal dependencies between persistent data of the particular version of the software module and other versions of the software module, wherein the intermediate version of the downgradable software module is identified from the retrieved temporal dependencies and the downgrade version and is reported to the downgradable software module, and wherein the downgrading of the software modules is performable without service interruption based on the retrieved temporal dependencies, whether the particular downgrade version of the software module is compatible or incompatible with a current version of the software module before the downgrading.

3. The software version management system according to claim 2, wherein the downgrading stops activities of the downgradable software module and subsequently loads and executes the intermediate version and reports the completion of the intermediate version to a host driver.

4. The software version management system according to claim 1, wherein the downgradable software module is started after completion of the conversion of the compatibility database to the downgrade version of the downgradable software module.

5. The software version management system according to claim 1, wherein the system is extendable to combine multiple databases describing compatibilities between software modules from multiple sources.

6. A computer program product to start, stop and replace one or more software modules on a computer system based on replacement actions, said computer program product comprising:

a non-transitory computer readable storage medium readable by a processing circuit and storing instructions for execution by the processing circuit for performing a method comprising:

retrieving temporal information from a downgradable software module, the downgradable software module comprising a compatibility database specifying dependencies between different versions of the software module, wherein the compatibility database comprises one or more revision identifiers and one or more attributes thereof for the different versions, and wherein the attributes describe properties of a migration from a first version of the different versions to a second version of the different versions, the properties comprising a concurrent update capability if the first version is replaced by the second version;

downgrading, based on a replacement action to downgrade, the downgradable software module to a particular downgrade version, the downgrading identifying an intermediate version of the downgradable software module, wherein the intermediate version comprises logic to convert the compatibility database to the downgrade version of the downgradable software module and based on execution and completion of the logic, the processor updates the software module to a version of the software module that recognizes the downgraded compatibility database; and restarting, based on a report of completion of the intermediate version, loading and starting the downgrade version of the software module.

7. The computer program product according to claim 6, wherein the compatibility database specifies temporal dependencies between persistent data of the particular version of the software module and other versions of the software module, wherein the intermediate version of the downgradable software module is identified from the retrieved temporal dependencies and the downgrade version and is reported to the downgradable software module, and wherein the downgrading of the software modules is performable without service interruption based on the retrieved temporal dependencies, whether the particular downgrade version of the software module is compatible or incompatible with a current version of the software module before the downgrading.

8. The computer program product according to claim 7, wherein the downgrading stops activities of the downgradable software module and subsequently loads and executes the intermediate version and reports the completion of the intermediate version to a host driver.

9. The computer program product according to claim 6, wherein the downgradable software module is started after completion of the conversion of the compatibility database to the downgrade version of the downgradable software module.

10. The computer program product according to claim 6, wherein the system is extendable to combine multiple databases describing compatibilities between software modules from multiple sources.

11. A method for starting, stopping and replacing one or more software modules on a computer system based on replacement actions, said method comprising:

retrieving temporal information from a downgradable software module, the downgradable software module comprising a compatibility database specifying dependencies between different versions of the software module, wherein the compatibility database comprises one or more revision identifiers and one or more attributes thereof for the different versions, and wherein the attributes describe properties of a migration from a first version of the different versions to a second version of the different versions, the properties comprising a concurrent update capability if the first version is replaced by the second version;

downgrading, based on a replacement action to downgrade, the downgradable software module to a particular downgrade version, the downgrading identifying an intermediate version of the downgradable software module, wherein the intermediate version comprises logic to convert the compatibility database to the downgrade version of the downgradable software module and based on execution and completion of the logic, the processor updates the software module to a version of the software module that recognizes the downgraded compatibility database; and restarting, based on a report of completion of the intermediate version, loading and starting the downgrade version of the software module.

12. The method according to claim 11, wherein the compatibility database specifies temporal dependencies between persistent data of the particular version of the software module and other versions of the software module, wherein the intermediate version of the downgradable software module is identified from the retrieved temporal dependencies and the downgrade version and is reported to the downgradable software module, and wherein the downgrading of the software modules is performable without service interruption based on the retrieved temporal dependencies, whether the particular downgrade version of the software module is compatible or incompatible with a current version of the software module before the downgrading.

13. The method according to claim 12, wherein the downgrading stops activities of the downgradable software module and subsequently loads and executes the intermediate version and reports the completion of the intermediate version to a host driver.

14. The method according to claim 11, wherein the downgradable software module is started after completion of the conversion of the compatibility database to the downgrade version of the downgradable software module.

* * * * *